US006552271B2

(12) United States Patent
Connor et al.

(10) Patent No.: US 6,552,271 B2
(45) Date of Patent: Apr. 22, 2003

(54) ELECTRICAL COMPRESSION CONNECTOR

(75) Inventors: Brian W. Connor, Amherst, NH (US); Benjamin J. Michaud, Manchester, NH (US)

(73) Assignee: FCI USA, Inc., Etters, PA (US)

( * ) Notice: Subject to any disclaimer, the term of this patent is extended or adjusted under 35 U.S.C. 154(b) by 0 days.

(21) Appl. No.: 09/901,808

(22) Filed: Jul. 10, 2001

(65) Prior Publication Data

US 2003/0010522 A1 Jan. 16, 2003

(51) Int. Cl.7 ............................ H01R 4/00; H01R 4/10; H02G 3/06; H02G 15/08

(52) U.S. Cl. .................... 174/84 R; 174/84 C; 439/877

(58) Field of Search ............................ 174/84 R, 84 C, 174/90, 92, 94 R; 439/877, 878; 403/275, 391

(56) References Cited

U.S. PATENT DOCUMENTS 2,938,069 A * 5/1960 Toedtman et al. ........ 174/71 R
2,956,108 A * 10/1960 Brenner .................... 174/71 R
3,322,888 A * 5/1967 Zemels ..................... 174/71 R
3,354,517 A * 11/1967 Levinsky .................. 174/71 R
3,781,459 A * 12/1973 Peek ........................ 174/71 R
4,350,843 A * 9/1982 Campbell et al. ......... 174/84 C
5,036,164 A * 7/1991 Schrader et al. ............... 174/7
5,103,068 A * 4/1992 Schrader ................... 174/71 R
5,162,615 A * 11/1992 Schrader et al. .......... 174/71 R
5,200,576 A * 4/1993 Schrader et al. .......... 174/71 R
5,396,033 A * 3/1995 Piriz et al. ................ 174/71 R
5,635,676 A * 6/1997 Piriz ........................ 174/84 C
5,898,131 A 4/1999 Chadbourne et al. ..... 174/84 C
6,261,137 B1 * 7/2001 Wilcox ..................... 174/84 C

OTHER PUBLICATIONS

YH3429 Data Sheet, Burndy Electrical (FCI USA Inc), Mar. 23, 1996, Rev # 1.*

* cited by examiner

*Primary Examiner*—Dean A. Reichard
*Assistant Examiner*—William H. Mavo, III
(74) *Attorney, Agent, or Firm*—Harrington & Smith, LLP

(57) ABSTRACT

An electrical compression connector including a first section having a main conductor receiving channel extending into a top side of the connector; and a second section integrally formed with the first section. The second section has three tap conductor receiving channels. A first one of the tap channels extends into a first lateral side of the connector. Second and third ones of the tap channels extend into a second lateral side of the connector. The second section has a bottom cantilevered leg with a curved downward and laterally outward extending portion and a laterally outward extending substantially straight portion extending to a distal end of the leg.

17 Claims, 5 Drawing Sheets

ELECTRICAL COMPRESSION CONNECTOR

BACKGROUND OF THE INVENTION

1. Field of the Invention

The present invention relates to electrical connectors and, more particularly, to an electrical compression connector.

2. Brief Description of Prior Developments

U.S. Pat. No. 5,898,131 discloses a twisted H-shaped electrical connector. A hydraulic compression tool can be used to compress the connector for connecting two conductors to each other at the same time. FCI USA Inc. sells electrical compression connectors under the part designation YH3931C which are specifically designed for the telecommunications industry for making parallel and tap connections to copper Class I and Class K stranded conductors.

Class K conductors are more flexible than Class I conductors. This increased flexibility is provided by a substantially larger number of individual strands in the conductor. For example, a 4/0 AWG Class I copper stranded conductor has 532 strands and a 4/0 AWG Class K copper stranded conductor has 2107 strands. The individual strands of a Class K conductor have a smaller diameter than the individual strands in a Class I conductor (0.01 inch versus 0.201 inch). However, a Class K conductor has a larger outer diameter than a Class I conductor of the same electrical size (i.e., a 4/0 AWG Class K conductor has a 0.627 inch nominal diameter, and a 4/0 AWG Class I conductor has a 0.613 inch nominal diameter).

For the YH3931C connector, the largest tap conductor receiving channel can accept and be properly crimped onto a Class I conductor between 4/0 and 1/0 AWG or a Class K conductor between 3/0 and 1/0 AWG. The YH3931C connector cannot be properly crimped onto a 4/0 AWG Class K conductor at its largest tap conductor receiving channel. The largest tap conductor receiving channel is too small to properly receive and connect to the larger diameter Class K conductor. Although a 4/0 AWG Class K conductor might be placed (at least partially) inside the largest tap conductor receiving channel of the conventional YH3931C compression connector, during compression strands of the Class K conductor are pushed out of the lateral side aperture of the tap conductor receiving channel before the aperture is closed. This creates a problem electrically due to the small percentage of strands actually contained in the compressed conductor tap receiving channel. These non-contained stands can also contact and thereby cause problems with nearby electrical or electronic components. In addition, these strands can break off of the conductor and cause additional problems with nearby electrical or electronic components.

There is a desire to provide an electrical compression connector with tap conductor receiving channels which can be used with Class I and Class K conductors having the same electrical wire size. There is also a desire to provide an electrical compression connector adapted to be connected to a Class I conductor or a Class K conductor of the same size and can be compressed onto the Class K conductor without strands of the conductor being pushed out of a lateral side aperture into the tap conductor receiving area before the aperture is closed.

SUMMARY OF THE INVENTION

In accordance with one aspect of the present invention, an electrical compression connector is provided including a first section having a main conductor receiving channel extending into a top side of the connector; and a second section integrally formed with the first section. The second section has three tap conductor receiving channels. A first one of the tap channels extends into a first lateral side of the connector. Second and third ones of the tap channels extend into a second lateral side of the connector. The second section has a bottom cantilevered leg with a curved downward and laterally outward extending portion and a laterally outward extending substantially straight portion extending to a distal end of the leg.

In accordance with another aspect of the present invention, an electrical compression connector is provided including a first section having a main conductor receiving channel extending into a top side of the connector; and a second section integrally formed with the first section. The second section has a first tap conductor receiving channel extending into a first lateral side of the connector and a second tap conductor receiving channel extending into an opposite second lateral side of the connector. The second section comprises a cantilevered leg which forms a bottom section of the first tap conductor receiving channel. An end portion of the leg is substantially straight and projects laterally outward from the first lateral side.

In accordance with another aspect of the present invention, an electrical compression connector is provided including a first section having a main conductor receiving channel extending into a top side of the connector; and a second section integrally formed with the first section. The second section has a first tap conductor receiving channel extending into a first lateral side of the connector. A second tap conductor receiving channel extends into an opposite second lateral side of the connector. A third tap conductor receiving channel extends into the second lateral side of the connector. The first tap conductor receiving channel has a concave top surface with a first radius of curvature and a bottom surface with a second different radius of curvature. The second radius of curvature is more than fifty percent larger than the first radius of curvature.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
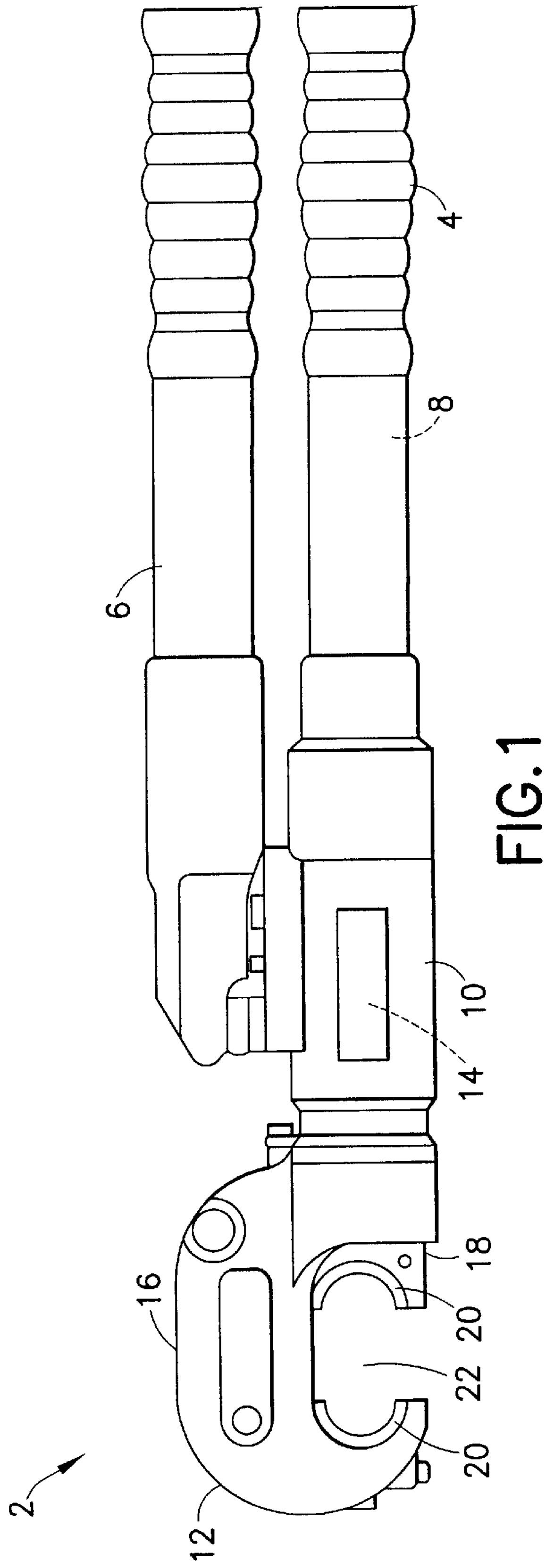
FIG. 1 PRIOR ART
FIG. 1 is an elevational side view of a conventional hydraulic hand operated connector compression tool.

Referring to FIG. 1, there shown an elevational side view of a conventional hydraulic tool 2 used to compress electrical compression connectors onto electrical conductors. One such tool is sold by FCI USA Inc. under the part designation Y750. However, the electrical connector of the present invention could be compressed onto electrical conductors by any suitable type of compression tool. For example, another such tool is sold by FCI USA Inc. under the part designation Y46.

The tool 2 shown in FIG. 1 generally comprises a first handle 4 having a fluid reservoir 8 therein, a second handle 6, a body 10 and a compression head 12. A hydraulic pump 14 is located inside the body 10. The compression head 12 generally comprises a frame 16 and a movable ram 18. The ram 18 is moved forward on the frame 16 by hydraulic pressure from hydraulic fluid delivered from the pump 14. The frame 16 and the ram 18 are each adapted to removably receive a crimping die 20. A connector receiving space 22 is formed between the two crimping dies 20. When the ram is advanced to move the two dies 20 towards each other, a connector located between the two dies is compressed or crimped.

Figure 2:
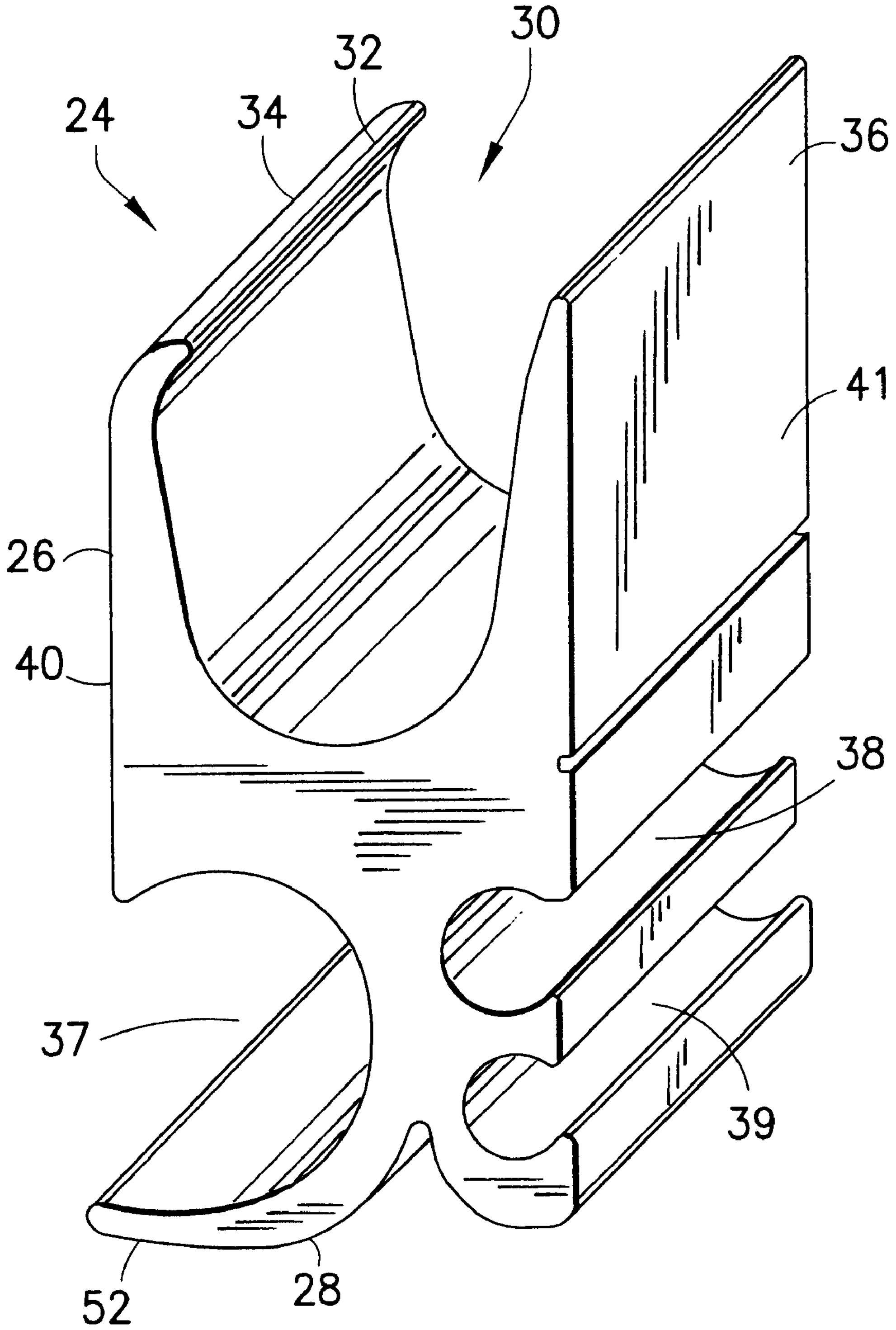
FIG. 2 is a perspective view of an electrical compression connector incorporating features of the present invention.
Figure 3:
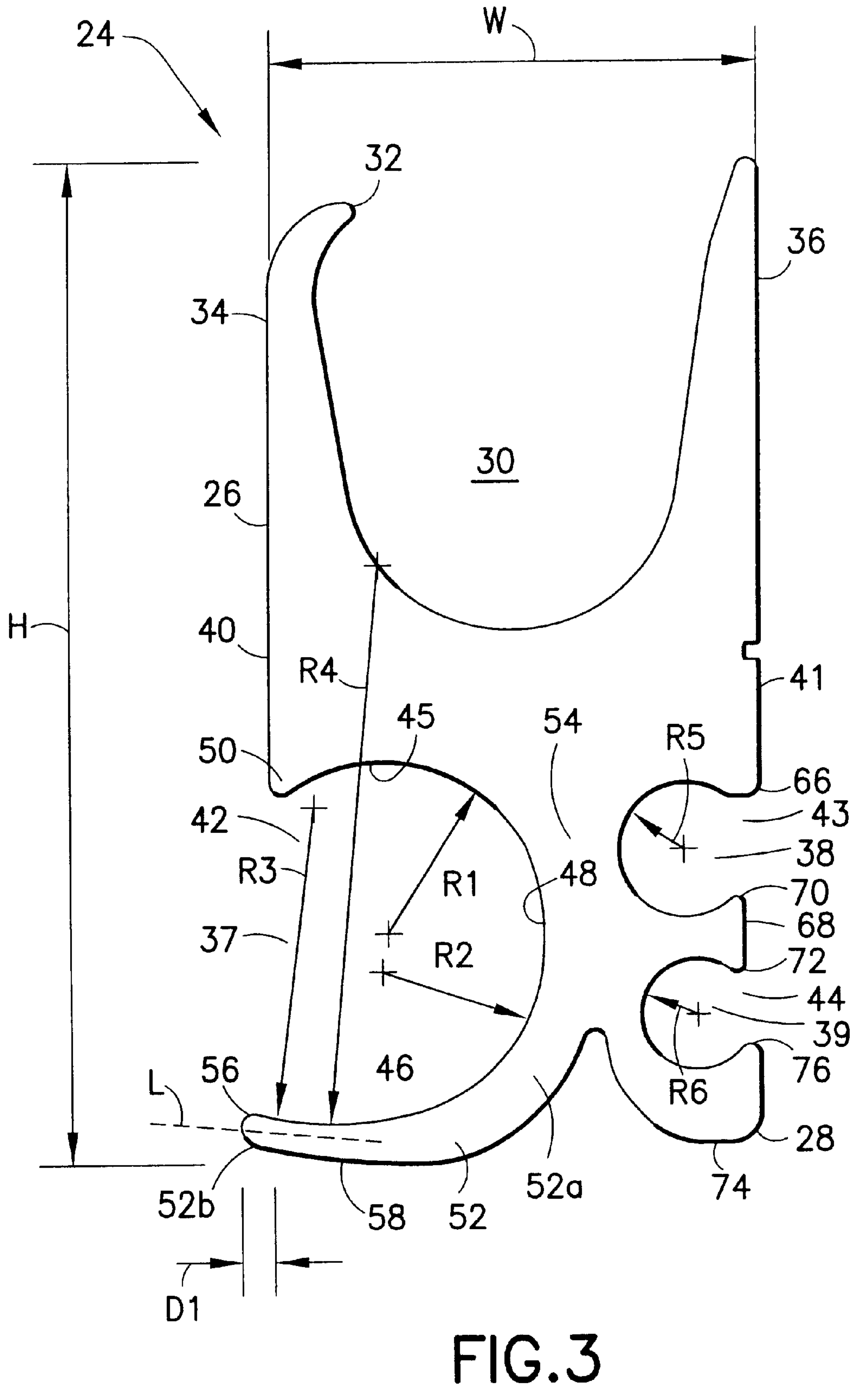
FIG. 3 is a front elevational view of the connector shown in FIG. 2.

Referring to FIGS. 2 and 3, there are shown a perspective view and a front elevational view of an electrical compression connector 24 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The connector 24 comprises a one-piece member. The one-piece member is preferably comprised of metal, such as copper. However, the one-piece member could be comprised of multiple components and/or could be comprised of any suitable materials, such as aluminum. The one-piece member is preferably an extruded member. However, any suitable type of method for manufacturing the one-piece member could be provided.

The connector 24 generally comprises a first section 26 and a second section 28. In this embodiment, the first section 26 is a top section of the connector and the second section 28 is a bottom section of the connector. The two sections 26, 28 are preferably integrally formed with each other during the extrusion process. Because the connector 24 is preferably manufactured by an extrusion process, the connector has a substantially uniform cross-section along its length. However, in alternate embodiments, the connector 24 could have sections along its length which do not have a uniform cross-section.

The top section 26 has a first conductor receiving channel 30 extending into a first top side 32 of the connector. The top section 26 has a general U-shaped profile. A first leg 34 has a curved top end. A second leg 36 has a relatively tapered or pointed top end. However, in alternate embodiments, the top section 26 and the legs 34, 36 could have any suitable type of shape.

The bottom section 28 has a second conductor receiving channel 37, a third conductor receiving channel 38, and a fourth conductor receiving channel 39. The second, third and fourth conductor receiving channels 37–39 are tap conductor receiving channels. The first channel 30 is a main run conductor receiving channel. The four conductor receiving channels 30, 37, 38 and 39 extend generally parallel to each other. In alternate embodiments more or less than three tap conductor receiving channels could be provided in the second section 28. The second conductor receiving channel 37 extends into a first lateral side 40 of the connector. The third and fourth conductor receiving channels 38, 39 extend into an opposite second lateral side 41 of the connector. Each channel in the second section has a respective aperture 42, 43, 44 at its respective lateral side 40,41.

In a preferred embodiment, the connector 24 has a height H which is about 3 inches, and a width W between the lateral sides 40,41 at the top section 26 which is about 1.35 inches. However, in alternate embodiments, the connector could have any suitable height and width. These dimensions (H and W) and the shape of the top section 26 are substantially the same as an existing conventional electrical compression connector sold by FCI USA Inc. under the part designation YH3931C.

The connector 24 differs from the YH3931C compression connector in two main respects. First, the first tap channel 37 has a larger size than in the conventional connector. Second, the shape of the first tap channel 37 is different and, in particular, its bottom leg is different. The combination of these two features provide a new and improved electrical compression connector which has numerous advantages.

The conventional YH3931C electrical compression connector is adapted to connect to Class I copper stranded conductor with a main run wire size (in its main conductor receiving area) between 750 kcmil and 350 kcmil, and a tap wire size (in its smaller tap conductor receiving areas) between 4/0 AWG and 1/0 AWG. The connector 24 is sized and shaped to connect to the same range of Class I copper conductors as the conventional YH3931C electrical compression connector. However, the connector 24 is also sized and shaped to connect to the same range electrical sizes of the larger outer diameter Class K stranded conductors (i.e., 4/0 AWG-1/0 AWG Class K stranded conductors).

When the conventional YH3931C electrical compression connector was attempted to be connected to a 4/0 AWG Class K stranded conductor in its largest tap channel, during crimping strands of the Class K conductor are pushed out of the tap channel and were not completely captured. This caused problems as noted above. The present invention overcomes these problems. The present invention allows all the strands of the 4/0 AWG Class K conductor to be retained in the first tap channel 37 during compression of the connector 24. This feature is provided by the combination of the increased size of the first tap channel 37 and the shape of the leg 52.

The first tap channel 37 has a top surface 45, a bottom surface 46, and a side surface 48 connected between the top and bottom surfaces. The top surface 45 is part of an outer downward projection 50 at the lateral side 40. The top surface 45 has a concave curved shape with a radius of curvature R1. In a preferred embodiment the radius of curvature R1 is about 0.5 inch. However, in alternate embodiments, the radius of curvature R1 could have any suitable length. In another alternate embodiment, the top surface 45 could have any suitable type of shape, so long as the surface has a general concave shape.

The bottom surface 46 is comprised of a top surface of a bottom cantilevered leg 52. The leg 52 has a first portion 52*a* and a second portion 52*b*. The first portion 52*a* has a curved shape. The first portion 52*a* extends downward from the center section 58 and then in a laterally outward direction. The second portion 52*b* is substantially straight as indicated by reference line L in FIG. 3. Although the top and bottom surfaces of the second portion 52*b* are slightly curved, the overall shape is substantially straight. The second portion 52*b* extends from the first portion 52*a* to the tip 56 in a lateral direction. Thus, the leg 52 extends from the bottom of a center section 54 in a general laterally downward and outward direction, and then laterally outward. A tip 56 of the leg 52 extends laterally outward past the side 40 by a distance D1. In a preferred embodiment D1 is about 0.25 inch. However, in alternate embodiments, D1 could have any suitable length.

The bottom surface 58 of the leg 52 is also generally curved and, in this embodiment, is not parallel to the surface 46. The bottom surface 58 has a radius of curvature R4 which is about 1.9 inches. However, in alternate embodiments, the radius of curvature R4 could have any suitable length. The surface 46 has a concave curved shape with a radius of curvature R3. In a preferred embodiment the radius of curvature R3 is about 1 inch. However, in alternate embodiments, the radius of curvature R3 could have any suitable length. In another alternate embodiment, the surface 46 could have any suitable type of shape, so long as the surface preferably has a general concave shape. The radius P2 is preferably at least about fifty percent larger than the radius R1.

The side surface 48 has a concave curved shape. However, in alternate embodiments, the side surface 48 could have any suitable type of shape. The side surface 48 extends along a side of the center section 54. The side surface 48 is located generally opposite the aperture 42 into the first tap receiving channel 37. In a preferred embodiment the radius of curvature R2 is about 0.5 inch. However, in alternate embodiments, the radius of curvature R2 could have any suitable length. R2 has a different center than R1, but the surface 48 connects the two different radius curved surfaces 45 and 46 to each other.

The second and third tap channels 38, 39 have general circular cross sections except at their apertures 43, 44. The second tap channel 38 has a radius of curvature R5 which is about 0.2 inch. The third tap channel 39 has a radius of curvature R6 which is about 0.17 inch. However, the channels 38, 39 could have any suitable shape or size. A lateral projection or leg 68 is located between the second and third tap channels 38, 39. The lateral projection 68 has a top projection 70 and a bottom projection 72. The top projection 70 extends upward generally towards the projection 66 at the lateral side 41 of the aperture 43.

The third tap channel 39 is generally defined by the lateral projection 68 and a bottom leg 74. The bottom leg 74 curves downward from the bottom of the middle section 54 and laterally outward in a direction of the lateral side 41. In this embodiment, the channel 39 has a general circular shape except at the aperture 44. The third tap channel 39 is located generally below the second tap channel 38. An end of the leg 74 has an upward projection 76 located opposite the downward projection 72 at the aperture 44.

Figure 4:
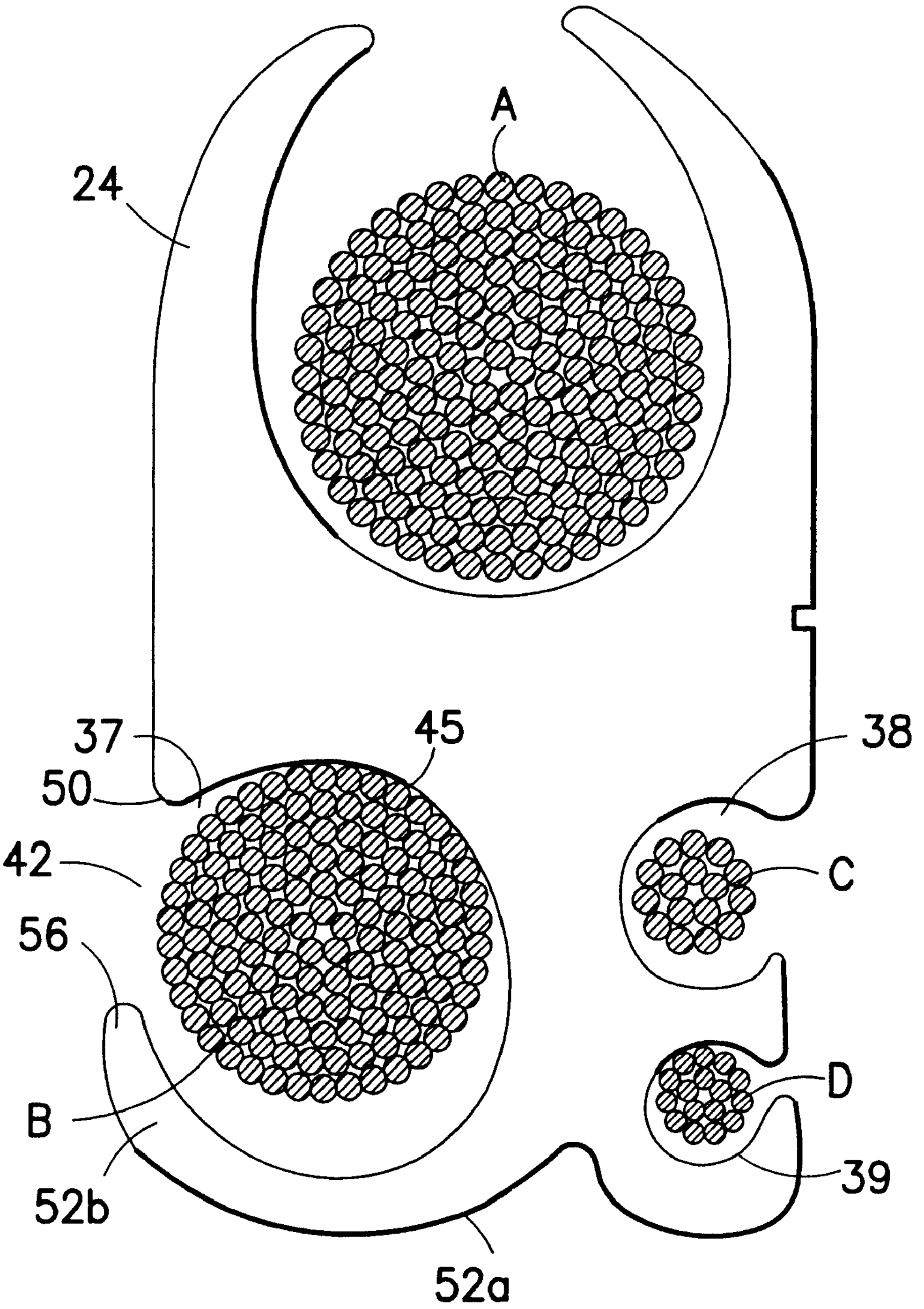
FIG. 4 is a front elevational view of the connector shown in FIG. 3 and four conductors with the connector partially crimped onto the conductors.

Referring also to FIG. 4, the connector 24 is shown at a partially crimped condition onto a main conductor A and three tap conductors B, C and D. One of the features of the present invention is in regard to the early closure of the side aperture 42 into the first tap channel 37. The connector 24 was designed to accept a relatively large size 4/0 AWG flex Class K conductor in the first tap location 37. With the conventional YH3931C connector, it is impossible to contain all of the strands of a 4/0 Class K conductor in the first largest tap channel. The connector 24 uses a unique design in the first tap channel 37 and an expanded volume to allow a 4/0 AWG Class K conductor to be located and properly completely crimped in the channel 37.

The design of the tap channel 37 still allows the connector to be formed by an extrusion process without having sections between the tap channels being formed too thin. In addition, the connector 24 has sufficient material such that, even though the connector has less material than the conventional YH3931C connector, it still does not cause performance problems electrically. The design of the connector 24 allows the aperture 42 at the tap channel 37 to start to close at the start of the closure of the main run channel 30. The closure of the tap channel 37 has a head start over the closure of the apertures 43–44 to other two remaining tap channels 38 and 39. The increased radius of curvature R1 at the top surface 45 of the second tap channel 37 allows the flex conductor B a place or location to move into rather than trying to spray out the opening 42 of the channel 37.

When crimping first starts, the second portion **52*b* is the first portion to start to deform. The second portion 52*b* starts to curve upward towards the projection 50, but also outward. Further deformation of the second portion 52*b* and the first portion 52*a* cause the tip 56 to curve upward and now inward towards the projection 50. The concave surface 45 provides an area for the tap conductor B to move before it starts to be compressed such that the tip 56 can move up to the projection 50 and close the aperture 42. The deformation of the leg 52, because of its substantially straight portion 52*b*, causes the tip 56 to move in an outward and then inward arc. This arc helps to insure capture of all the strands of the 4/0 AWG class K conductor in the first tap channel 37**.

With the present invention, during the compression or crimping process, the legs 52, 68 and 74 are deformed upward to contact the respective opposite downward projections 50, 66 and 72. This closes the lateral side apertures 42–44 into the tap channels 37–39. The deformation of the legs 52, 68 and 74, to close the lateral side apertures 42–44, is completed before substantial compression of the main conductor A in the top section 26 occurs. In other words, the closing of the lateral side apertures 42–44 occurs at an early stage during the connector compression process. This early stage closing of the lateral side apertures 42 prevents strands of the conductors from exiting the apertures 42–44 during the start of crimping. This is because the apertures 42–44 are closed before the tap conductors B, C and D in the tap channels 38–39 are exposed to substantial compression. Therefore, compressive forces acting upon the tap conductors B–D before the apertures 42–44 close are insufficient to force strands of the tap conductors B–D out of the apertures 42–44. With the apertures 42–44 closed, the connector 24 can continue to be compressed to fully crimp the connector on the conductors A–D. Thus, the connector 24 can be used to connect to both Class I and Class K stranded conductors.

Figure 5:
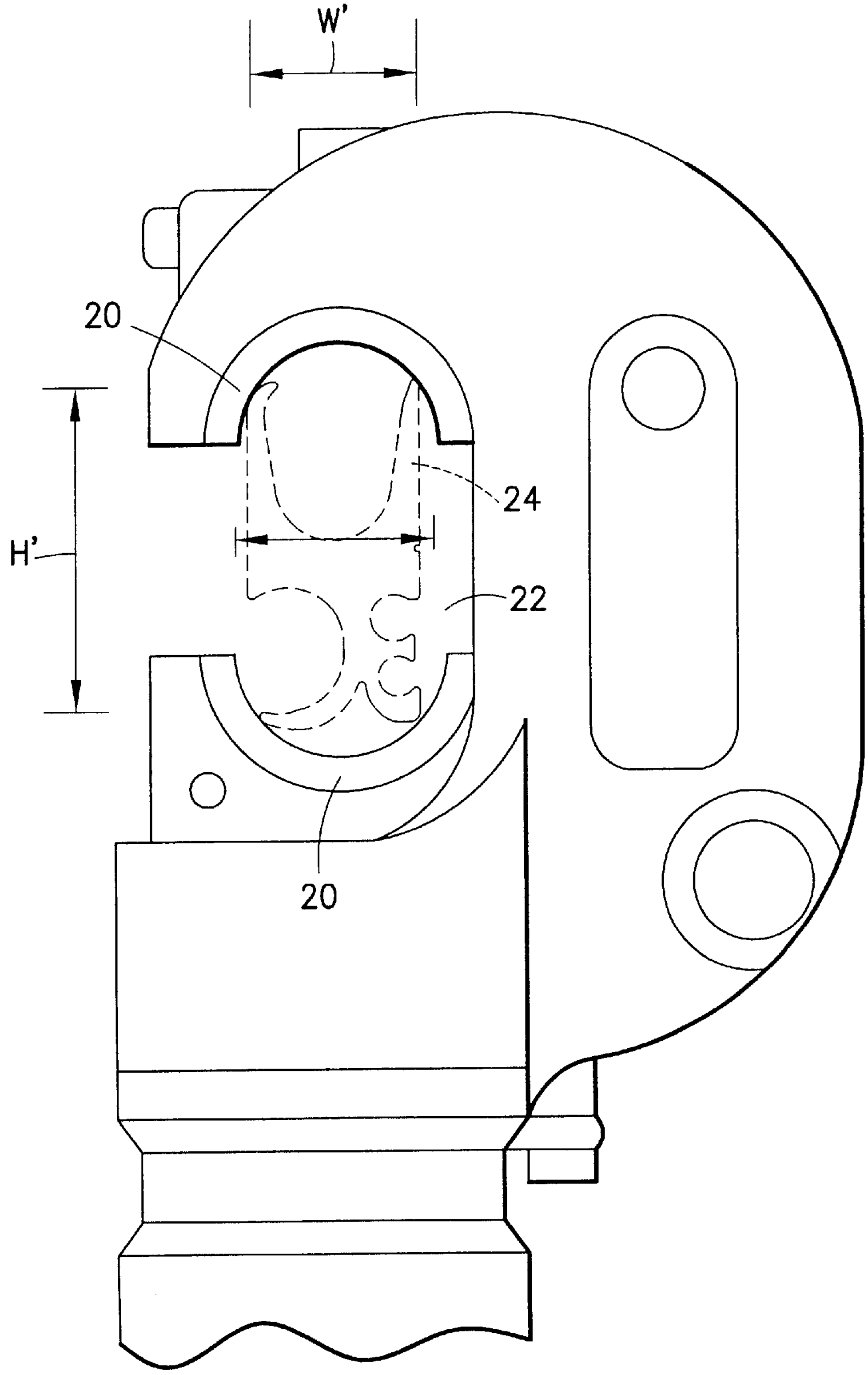
FIG. 5 is an enlarged elevational view of the crimping head of the tool shown in FIG. 1 with the connector shown in dotted lines.

Referring also to FIG. 5, another feature of the present invention will be described. As noted above, the dimensions H and W are preferably substantially the same as the conventional YH3931C electrical compression connector. The YH3931C connector is compressed or crimped by use of specific types of dies 20 in the tool 2, such as P dies sold by FCI USA Inc (more specifically P-YFR dies in the Y46 tool). There is a desire to allow a 4/0 AWG Class K tap conductor to be connected by a compression connector, similar to the YH3931C connector, which can use the same tool (such as a Y46 tool) and the same dies (such as P-YFR dies) as have been used in the past to crimp the YH3931C connector. However, the connector receiving area 22 between the dies 20 has a limited space. This presents a height H' and width W' limitation for any type of new connector if the same tool and dies are desired to be used. Thus, the overall size of the new connector could not merely be increased. If the new connector was too big, it could not fit within the connector receiving area 22. In addition, the body of the connector must comprise sufficient material and sufficient dimensions to prevent failure of the connector during crimping or compression and, provide adequate electrical properties.

The connector 24 has been specifically designed to be usable with the same tool and dies as were used in the past to crimp the YH3931C connector. Therefore, users do not need to buy a new tool or new dies. The same tool and dies used to crimped the YH3931C connector can be used to crimp the connector 24 onto either Class I or Class K conductors. Although the size of the tap channel 37 has been increased compared to the conventional YH3931C connector, because of the cooperating nature of the shape of the leg 52 and the increased radius R1, the increase in size of the first tap channel 37 has been minimized. Thus, the body of the connector has sufficient material and sufficient dimensions to prevent failure of the connector during crimping and still provide adequate electrical properties.

The new connector 24 uses a unique straight leg design at the bottom of the first tap channel 37. This unique straight leg design increases the volume of the first tap channel 37. The tap channel opening 42 had to be designed in such a way that the bottom of the leg 52 would be almost straight with a very gradual radius on the bottom of the connector. One of the important aspects of this design was that the leg 52 needed to maintain a certain thickness at its distal end 56. Due to the fact that the connector 24 is an extruded part, and the die is the negative image of the part, during the actual extrusion process a tremendous amount of pressure is needed to force the copper billet through the die. If any section of the die is too thin, the stresses in that area will be very high and would cause a failure of the die in that area. The special design of the leg 52 is specifically engineered to handle the extremely high pressures.

Without the capability of capturing all of the strands of the conductor, the result would affect its ability to function correctly electrically. This new design allows all the strands of a 4/0 AWG flex cable to be captured in the first tap channel 37. The increased volume of the first tap channel from the radius R1 and the way the straight leg curls in an upward direction allows all the strands to be captured. This tap channel 37 will now also close faster than the other tap channels; giving it a head start during compression.

Increasing the size of the first tap channel 37 alone, without also providing the new shape of the leg 52 could have resulted in a connector without sufficient material or dimensions to prevent failure during crimping. The shape of the leg 52 also helps to minimize the increase in size of the overall connector, but still allow quick closure of the lateral side aperture 42; which is now also able to receive a 4/0 AWG class K conductor.

The combination of the increased size first tap channel 37 and the shape of the leg 52 produces an additive affect. These features combine to allow the connector 24 to be connected to a tap class K conductor and close the lateral side aperture to the tap channel 37 before compression forces on the tap conductor attempt to push the tap conductor B out of the lateral side aperture 42, but nonetheless allows the connector to have sufficient material and rigidity to withstand the crimping action of the crimping tool without a failure of the connector.

The new design is easy to manufacture as an extrusion. The new design is capable of containing all the strands of highly flexible conductor in the tap locations. The new design has a greater conductor range. The connector 24 also uses less material during manufacturing. This results in a cost savings during manufacturing.

The compression tool 2 crimps the top and bottom sections 26,28 onto the four conductors A–D at substantially a same time. Although the legs 52, 68 and 74 are deformed to close the lateral side apertures 42–44 at an early stage of the connector's crimping, the tips 56, 70, 76 contact the projections 50, 66 and 72. This temporarily stops or slow down further significant compression of the bottom section 28 until more significant deformation of the top section 26 occurs. The legs 34, 36 are crimped inward and downward towards the conductor A, and then the connector 24 is relatively evenly compressed onto the four conductors A–D. This prevents the connector 24 from piercing too deeply into the tap conductors B, C and D and potentially creating a bad crimp.

The connector 24 is particularly useful in the telecommunications industry for distribution of power by use of Class K conductors. The connector 24 can receive either a Class I or a Class K conductor in main run channel 30 and, can receive either a Class I and/or a Class K conductor in each of the respective tap conductor channels.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical compression connector comprising:

a first section having a main conductor receiving channel extending into a top side of the connector; and a second section integrally formed with the first section, the second section having three tap conductor receiving channels, a first one of the tap channels extending into a first lateral side of the connector and, second and third ones of the tap channels extending into a second lateral side of the connector, wherein the second section has a bottom cantilevered leg with a curved downward and laterally outward extending portion and a laterally outward extending substantially straight portion extending to a distal end of the leg, wherein the first tap channel has a top surface with a concave shape and a first radius of curvature, wherein the first tap channel has a bottom concave surface with a second different radius of curvature, and wherein the second radius of curvature is at least about fifty percent larger than the first radius of curvature.

2. An electrical compression connector as in claim 1 wherein a bottom surface of the substantially straight portion of the cantilevered leg is slightly curved with a third radius of curvature about twice as large as the second radius of curvature.

3. An electrical compression connector as in claim 1 wherein the first section comprises a general "U" shape.

4. An electrical compression connector as in claim 1 wherein the first and second sections are integrally formed as an extruded member.

5. An electrical compression connector as in claim 1 wherein the distal end of the leg projects laterally outward at the first lateral side of the connector.

6. An electrical compression connector comprising:

a first section having a main conductor receiving channel extending into a top side of the connector; and a second section integrally formed with the first section, the second section having three tap conductor receiving channels, a first one of the tap channels extending into a first lateral side of the connector and, second and third ones of the tap channels extending into a second lateral side of the connector, wherein the second section has a bottom cantilevered leg with a curved downward and laterally outward extending portion and a laterally outward extending substantially straight portion extending to a distal end of the leg, wherein the first tap channel has a top surface with a concave shape and a first radius of curvature, wherein the first tap channel has an interior side contiguous with the top surface, the interior side having a concave curved shape with a radius of curvature about the same size as the first radius of curvature.

7. An electrical compression connector comprising:

a first section having a main conductor receiving channel extending into a top side of the connector; and a second section integrally formed with the first section, the second section having a first tap conductor receiving channel extending into a first lateral side of the connector and a second tap conductor receiving channel extending into an opposite second lateral side of the connector, wherein the second section comprises a cantilevered leg which forms a bottom section of the first tap conductor receiving channel, and wherein an end portion of the leg is substantially straight and projects laterally outward from the first lateral side, wherein the first tap channel has a top surface with a concave shape and a first radius of curvature, wherein the first tap channel has a bottom concave surface with a second different radius of curvature, wherein the second radius of curvature is about twice as large as the first radius of curvature.

8. An electrical compression connector as in claim 7 wherein the cantilevered leg comprises a curved downward and laterally outward extending portion located before the end portion.

9. An electrical compression connector as in claim 7 wherein a bottom surface of the substantially straight end portion of the cantilevered leg is slightly curved with a third radius of curvature about twice as large as the second radius of curvature.

10. An electrical compression connector as in claim 7 wherein the first section comprises a general “U” shape.

11. An electrical compression connector as in claim 7 wherein the first and second sections are integrally formed as an extruded member.

12. An electrical compression connector comprising:

a first section having a main conductor receiving channel extending into a top side of the connector; and a second section integrally formed with the first section, the second section having a first tap conductor receiving channel extending into a first lateral side of the connector and a second tap conductor receiving channel extending into an opposite second lateral side of the connector, wherein the second section comprises a cantilevered leg which forms a bottom section of the first tap conductor receiving channel, and wherein an end portion of the leg is substantially straight and projects laterally outward from the first lateral side, wherein the first tap channel has a top surface with a concave shape and a first radius of curvature, and wherein the first tap channel has an interior side contiguous with the top surface, the interior side having a concave curved shape with a radius of curvature about the same size as the first radius of curvature.

13. An electrical compression connector comprising:

a first section having a main conductor receiving channel extending into a top side of the connector; and a second section integrally formed with the first section, the second section having a first tap conductor receiving channel extending into a first lateral side of the connector, a second tap conductor receiving channel extending into an opposite second lateral side of the connector, and a third tap conductor receiving channel extending into the second lateral side of the connector, wherein the first tap conductor receiving channel has a concave top surface with a first radius of curvature and a bottom surface with a second different radius of curvature, and wherein the second radius of curvature is more than fifty percent larger than the first radius of curvature.

14. An electrical compression connector as in claim 13 wherein the second radius of curvature is about twice as large as the first radius of curvature.

15. An electrical compression connector as in claim 13 wherein the second section comprises a cantilevered leg, wherein the cantilevered leg comprises a substantially straight section extending laterally outward from the first lateral side of the connector, and wherein the cantilevered leg has a top surface which forms a portion of the bottom surface of the first tap conductor receiving channel.

16. An electrical compression connector as in claim 15 wherein the substantially straight section of the cantilevered leg has a slightly curved bottom surface with a third radius of curvature about twice as large as the second radius of curvature.

17. An electrical compression connector comprising:

a first section having a main conductor receiving channel extending into a top side of the connector; and a second section integrally formed with the first section, the second section having three tap conductor receiving channels, a first one of the tap channels extending into a first lateral side of the connector and, second and third ones of the tap channels extending into a second lateral side of the connector, wherein the second section has a bottom cantilevered leg which forms part of the first tap channel, the bottom cantilevered leg having a curved downward and laterally outward extending portion and a laterally outward extending substantially straight portion extending to a distal end of the leg from the curved downward and laterally outward extending portion, and wherein the distal end of the leg extends past a lateral side of the first section.

* * * * *